United States Patent
Nicholas et al.

(10) Patent No.: US 12,444,012 B2
(45) Date of Patent: Oct. 14, 2025

(54) DISPLAY PRE-OPERATING SYSTEM CONTENT WITH MULTIPLEXER-LESS DISCRETE THUNDERBOLT

(71) Applicant: DELL PRODUCTS L.P., Round Rock, TX (US)

(72) Inventors: Ken Nicholas, Leander, TX (US); Ivan Guerra, Round Rock, TX (US); William D. Leara, Round Rock, TX (US); Ahsan Habib, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 170 days.

(21) Appl. No.: 17/972,505

(22) Filed: Oct. 24, 2022

(65) Prior Publication Data
US 2024/0135484 A1 Apr. 25, 2024
US 2024/0233063 A9 Jul. 11, 2024

(51) Int. Cl.
*G06T 1/20* (2006.01)
*G06F 3/14* (2006.01)

(52) U.S. Cl.
CPC . *G06T 1/20* (2013.01); *G06F 3/14* (2013.01)

(58) Field of Classification Search
USPC .......................................................... 345/522
See application file for complete search history.

(56) References Cited

U.S. PATENT DOCUMENTS

| | | | |
|---|---|---|---|
| 10,789,074 B2 | 9/2020 | Joshi et al. | |
| 11,250,759 B1 | 2/2022 | Peana et al. | |
| 2007/0033295 A1* | 2/2007 | Marriott | G06F 8/65 709/248 |
| 2010/0315427 A1* | 12/2010 | Wyatt | G09G 5/12 345/502 |
| 2014/0281444 A1* | 9/2014 | Waltermann | G06F 1/162 713/1 |
| 2015/0205616 A1* | 7/2015 | Thai | G06F 9/4401 345/542 |
| 2021/0150659 A1* | 5/2021 | Guerra | G09G 5/363 |
| 2022/0068242 A1* | 3/2022 | Maloney | G09G 5/363 |

* cited by examiner

*Primary Examiner* — James A Thompson
*Assistant Examiner* — Kim Thanh T Tran
(74) *Attorney, Agent, or Firm* — Larson Newman, LLP

(57) ABSTRACT

An information handling system sets, in response to a power event, a discrete graphics processing unit to transmit graphics data to an external display monitor and an internal display panel. In response to determining that a hybrid graphics mode is enabled and that a video driver has been loaded, the system switches a source of the graphics data to the internal display panel from the discrete graphics processing unit to an integrated graphics processing unit while keeping the discrete graphics processing unit to provide the graphics data to the external display monitor.

20 Claims, 3 Drawing Sheets

DISPLAY PRE-OPERATING SYSTEM CONTENT WITH MULTIPLEXER-LESS DISCRETE THUNDERBOLT

FIELD OF THE DISCLOSURE

The present disclosure generally relates to information handling systems, and more particularly relates to improving external display of pre-operating system content.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system sets, in response to a power event, a discrete graphics processing unit to transmit graphics data to an external display monitor and an internal display panel. In response to determining that a hybrid graphics mode is enabled and that a video driver has been loaded, the system switches a source of the graphics data to the internal display panel from the discrete graphics processing unit to an integrated graphics processing unit while keeping the discrete graphics processing unit to provide the graphics data to the external display monitor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
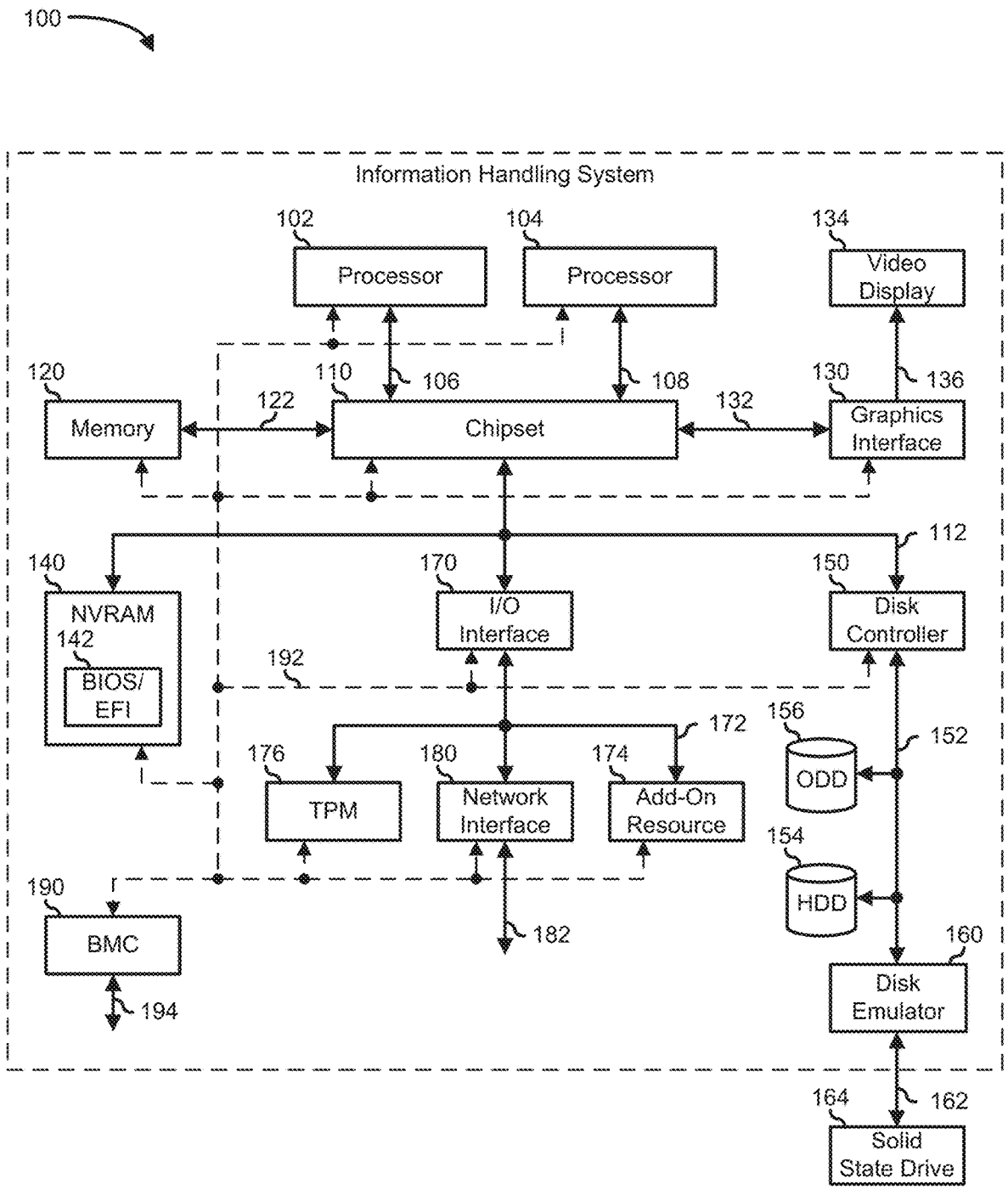
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included in a chassis of a blade server can be referred to as a chassis management controller and embedded controllers included in the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Some mobile workstations, such as notebook computers or laptops, support the ability to drive an internal and external display from either the integrated graphics processing unit (iGPU) or discrete (dGPU). The iGPU is integrated within the host CPU while the dGPU may be coupled to the CPU using an internal data bus. Typically, the dGPU provides higher performance and is often used to drive an external display monitor. The external display monitor is typically connected to the mobile workstation via a docking station or USB hub. However, while the workstation is in the pre-operating system environment, the BIOS typically supports graphics output from either the iGPU or the dGPU which usually defaults to support the iGPU. Because the external display monitor typically is supported by the dGPU, users who work with the lid of their mobile workstation closed may not see error messages or other issues encountered by the workstation during the boot process.

To provide dGPU support to the external display monitor in the pre-operating system environment, a user may update a BIOS setup to enable switchable graphics support and select a discrete graphics controller direct output mode. Currently, the ability of the dGPU to provide graphics output to an external display monitor at the pre-operating system level is performed using multiplexers. The multiplexers connect the dGPU to the controller of the hardware interface for the external display monitor. For example, a multiplexer is typically used between the dGPU and a Thunderbolt® chip. However, with the recent trend for thinner and lighter portable workstations, there is a desire to reduce components while maintaining current functionality and reducing manufacturing costs. Accordingly, the present disclosure provides a system and method that allows the removal of these multiplexers while still providing support to an external display monitor in the pre-operating system environment. Thus, resulting in manufacturing cost savings while also reducing the size of the PCB.

Figure 2:
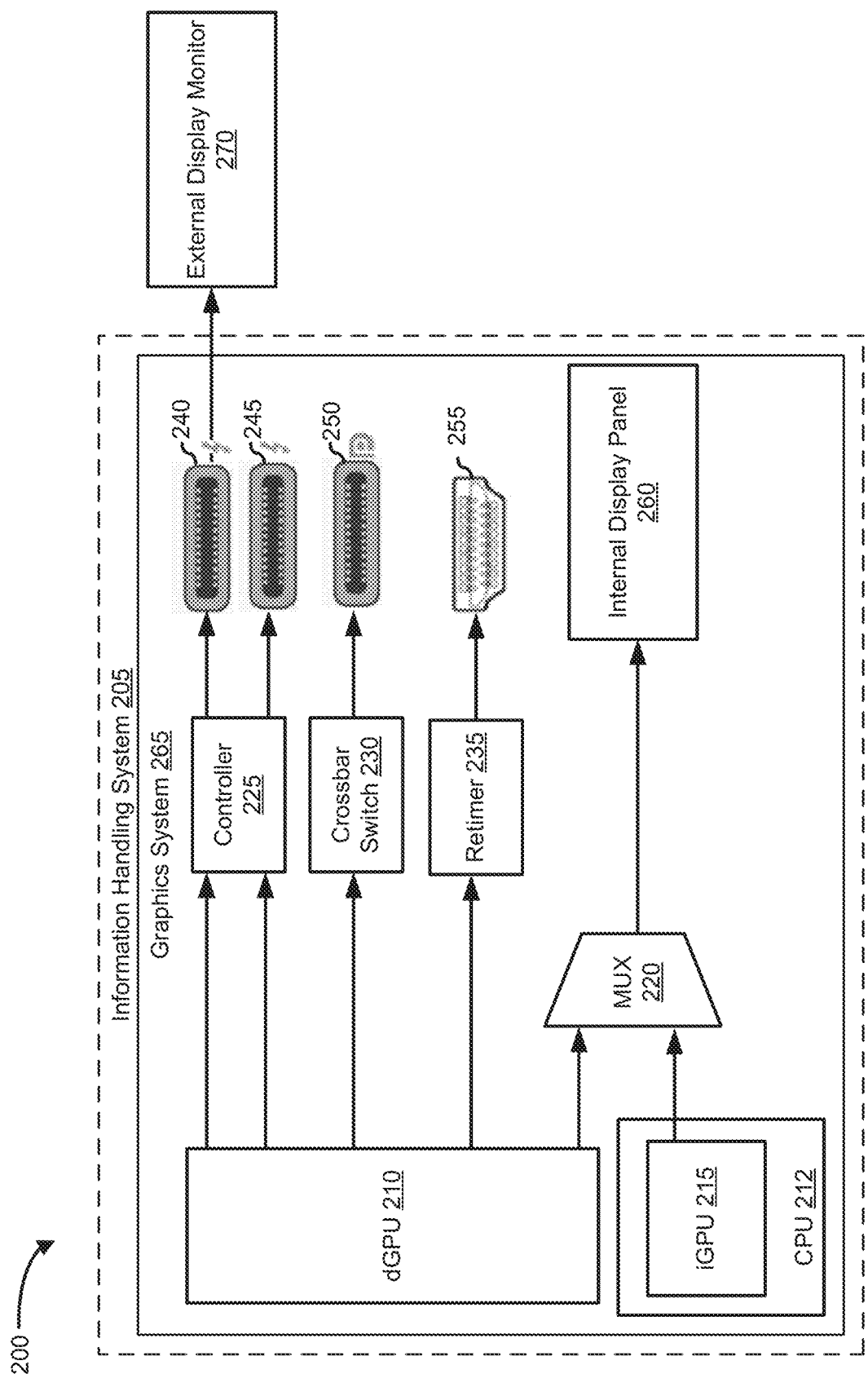
FIG. 2 is a block diagram illustrating a system for improving the external display of pre-operating system content, according to an embodiment of the present disclosure.

FIG. 2 shows an environment 200 for an improved system design for the display of pre-operating system content at an external display monitor. In particular, environment 200 includes an improved system design for the external display of pre-operating system content via a multiplexer-less discrete Thunderbolt™ interface. Environment 200 includes an information handling system 205 which is similar to information handling system 100 of FIG. 1 and an external display monitor 270. Information handling system 205 includes a graphics system 265 which includes a dGPU 210, a CPU 212, a multiplexer (MUX) 220, a controller 225, a crossbar switch 230, a retimer 235, interfaces 240, 245, 250, and 255. Further, CPU 212 includes an iGPU 215. Interfaces 240 and 245 are coupled to dGPU 210 via controller 225. Interface 250 is coupled to dGPU 210 via crossbar switch 230. Interface 255 is coupled to dGPU 210 via retimer 235. In one embodiment, dGPU 210 is connected to controller 225, crossbar switch 230, and retimer 235 without using a multiplexer.

Internal display panel 260 and external display monitor 270 may utilize a liquid crystal display, light-emitting diodes, organic light-emitting diodes, or other display technologies. While internal display panel 260 may be a display integrated into information handling system 205, such as in a lid coupled to the housing of the workstation, external display monitor 270 may be coupled to information handling system 205 via an interface, such as one of interfaces 240, 245, 250, and 255. In this example, external display monitor 270 may be connected to interface 240 via a docking station or USB hub. In one example, interfaces 240 and 245 may be Thunderbolt® interfaces, while interface 250 may be a DisplayPort™ interface, and interface 255 may be an HDMI. In one example, interfaces 240, 245, and 250 may be USB Type-C ports. Those of ordinary skill in the art will appreciate that graphics system 265 may include more or less than the interfaces shown and will not be limited by the present disclosure. In addition, information handling system 205 may have more than one iGPU and/or dGPU.

CPU 212 may be an Intel® processor, an Advanced Micro Devices® (AMD) processor, or one of many other suitable processing devices. In one mode of operation, video or graphics content from CPU 212 may be sourced at any given time by either iGPU 215 or dGPU 210. MUX 220 may be used to select between iGPU 215 and dGPU 210 as a source of graphics data input to internal display panel 260. In one embodiment, a signal may be used to control a setting in MUX 220 to select between iGPU 215 and dGPU 210 as the current source of graphics data input to internal display panel 260. MUX 220 may be an embedded DisplayPort (eDP) multiplexer used with an eDP cable that connects internal display panel 260 and MUX 220 to iGPU 215 and dGPU 210.

External display monitor 270 may be connected to an external docking station which is then connected to dGPU via interface 240 and controller 225. Controller 225, also referred to as a chipset, may be configured to drive graphics data to external display monitor 270 via interface 240. As shown, controller 225 may support more than one interface. In this example, controller 225 supports interfaces 240 and 245. In one embodiment, controller 225 may be a Thunderbolt™ controller which may switch operating modes to drive different interfaces such as Native USB, Native DisplayPort™, and Thunderbolt™ at 20 and 40 gigabytes per second (Gbps). Recent designs of the Thunderbolt™ controller provide support for DisplayPort™ 2.1 ultra-high bit rate 20 Gbps (UHBR20) data rate. Traditionally, Thunderbolt™ multiplexers have been used when switching modes.

However, the availability, cost of the Thunderbolt™ multiplexers, and layout requirements restrict usage of the multiplexers in the recent platform design. To address these issues, the multiplexers have been removed as depicted in graphics system 265. Removing these multiplexers reduces the manufacturing cost while providing additional space in the PCB or otherwise having the size of the PCB reduced. However, with the removal of the multiplexers, the direct output graphics mode, wherein the iGPU drives internal display panel 260 and dGPU 210 drives external display monitor 270, may no longer be supported. This issue is addressed in the design of graphics system 265, wherein controller 225 is connected directly to dGPU 210. Further, dGPU 210 provides support for external display monitor 270 in the pre-operating system environment by default.

Because dGPU 210 is directly coupled to controller 225 of interfaces 240 and 245, at a power event of information handling system 205 and consequently its boot process, dGPU 210 is capable of providing graphics data to external display monitor 270. In addition, dGPU 210 may also be configured to provide graphics to internal display panel 260 during the boot process. Crossbar switch 230 may also be used to route the graphics data from dGPU 210 to external display monitor 270 via interface 250. While retimer 235 may be used to route graphics data to external display monitor 270 via interface 255. After successfully booting to the operating system, if the hybrid mode of the BIOS setup was chosen by a user, then an embedded controller, similar to BMC 190 of FIG. 1 may send a signal to MUX 220 such that internal display panel 260 may be driven by iGPU 215 instead dGPU 210.

Those of ordinary skill in the art will appreciate that the configuration, hardware, and/or software components of information handling system 205 depicted in FIG. 2 may vary. For example, the illustrative components within environment 200 are not intended to be exhaustive, but rather are representative to highlight components that can be utilized to implement aspects of the present disclosure. For example, other devices and/or components may be used in addition to or in place of the devices/components depicted. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip. The depicted example does not convey or imply any architectural or other limitations with respect to the presently described embodiments and/or the general disclosure. In the discussion of the figures, reference may also be made to components illustrated in other figures for the continuity of the description.

Figure 3:
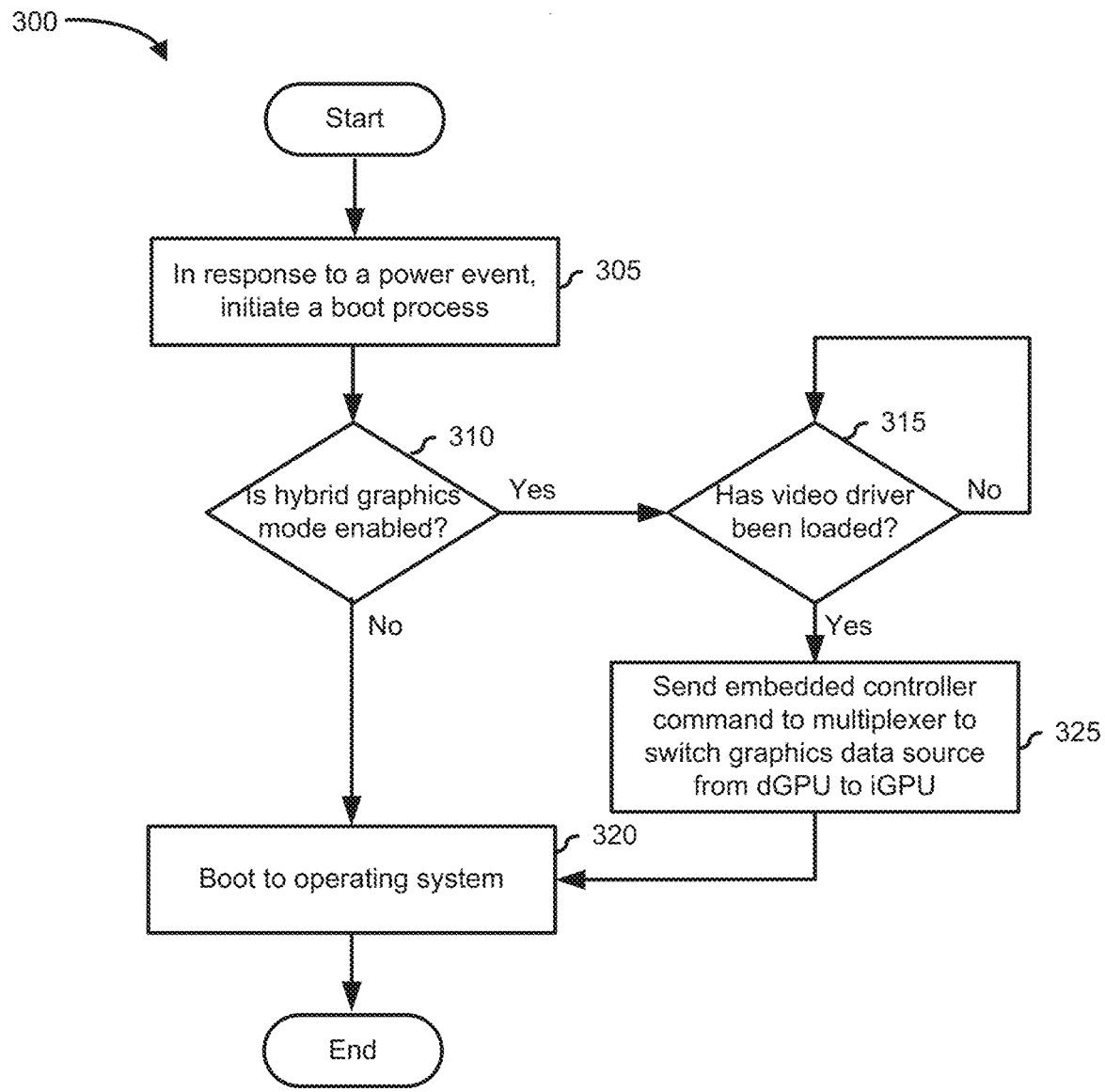
FIG. 3 is a flowchart illustrating a method for improving the external display of pre-operating system content, according to an embodiment of the present disclosure.

FIG. 3 shows a flowchart of a method 300 for an improved mechanism for the external display of pre-operating system content. Method 300 may be performed by one or more components of environment 200 of FIG. 2. However, while embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 300 typically starts at block 305 where there is a power event, such as a change in the power state of the information handling system, and the boot process is started. For example, the information handling system is powered-on, reset, or restarted. At this point, the lid housing the internal display panel of the information handling system is closed. In addition, at this powered-on state, the pre-operating system graphics is configured to use the discrete graphics mode even if the BIOS setting was configured to use a different graphics mode. For example, the information handling system defaults to the discrete mode even if the BIOS setup setting was set to support a hybrid graphics mode, wherein the iGPU drives the internal display panel and external display monitor while the dGPU acts as a graphics accelerator. In particular, in the pre-operating system environment, the dGPU provides graphics data and content to the interfaces used by external peripheral devices, such as interfaces 240, 245, 250, and 255 of FIG. 2. In addition, dGPU provides graphics data to the internal display panel of the information handling system via a multiplexer. This allows the pre-operating system display content to be displayed at both the internal display panel and external display monitor during the boot process before the video driver is loaded. This is the opposite of typical settings that use the iGPU to provide graphics data while in the pre-operating system environment.

The method proceeds to decision block 310, where the method determines whether the hybrid graphics mode is enabled in the BIOS settings. If the hybrid graphics mode is enabled, then the "YES" branch is taken, and the method proceeds to decision block 315. If the hybrid graphics mode is not enabled, then the method proceeds to block 320. At decision block 315, the method determines whether a video driver has been loaded. The boot process continues, and the video driver may be loaded during the driver execution environment phase of the boot process. If the video driver has been loaded, then the method proceeds to block 325. If the video driver has not been loaded, then the method loops back to the decision block 315.

At block 325, an embedded controller, similar to BMC 190 of FIG. 1, may send a command or signal to the multiplexer to switch the GPU used by the internal display panel from the dGPU to the iGPU. After the switch, the method proceeds to block 320 where the information handling system continues to boot to the operating system. At this point, if the hybrid graphics mode is enabled then the internal display panel may source its graphics input from iGPU instead of the dGPU. Otherwise, the internal display panel may continue to source its graphics input from the dGPU.

Although FIG. 3 show example blocks of method 300 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   in response to a power event of an information handling system, setting a discrete graphics processing unit, by a processor, to transmit pre-operating system graphics data to an external display monitor and an internal display panel that is coupled to an integrated graphics processing unit during a boot process;
   in response to determining that a hybrid graphics mode is enabled and that a video driver has been loaded during the boot process, switching a source of the pre-operating system graphics data to the internal display panel from the discrete graphics processing unit to the integrated graphics processing unit while keeping the discrete graphics processing unit to transmit the pre-operating system graphics data to the external display monitor allowing the pre-operating system graphics data to be displayed at both the internal display panel and the external display monitor; and
   in response to determining that the hybrid graphics mode is not enabled and that the video driver has not been loaded during the boot process, keeping the discrete graphics processing unit to transmit the pre-operating system graphics data to the external display monitor and the internal display panel during the boot process.

2. The method of claim 1, further comprising sending a signal to a multiplexer for the switching of the source of the pre-operating system graphics data provided to the internal display panel.

3. The method of claim 2, wherein the sending of the signal is performed by an embedded controller.

4. The method of claim 1, wherein the pre-operating system graphics data is transmitted to the external display monitor via a Thunderbolt interface.

5. The method of claim 1, wherein the discrete graphics processing unit is connected to a Thunderbolt controller.

6. The method of claim 1, wherein a lid housing the internal display panel is closed.

7. The method of claim 1, wherein the switching from the discrete graphics processing unit to the integrated graphics processing unit is performed before the information handling system boots to an operating system.

8. An information handling system, comprising:
a processor; and
a memory device storing code that when executed causes the processor to perform operations, the operations including:
in response to a power event of the information handling system, setting a discrete graphics processing unit to transmit pre-operating system graphics data to an external display monitor and an internal display panel that is coupled to an integrated graphics processing unit during a boot process;
in response to determining that a hybrid graphics mode is enabled and that a video driver has been loaded during the boot process, switching a source of the pre-operating system graphics data to the internal display panel from the discrete graphics processing unit to the integrated graphics processing unit while keeping the discrete graphics processing unit to transmit the pre-operating system graphics data to the external display monitor; and
in response to determining that the hybrid graphics mode is not enabled and that the video driver has not been loaded during the boot process keeping the discrete graphics processing unit to transmit the pre-operating system graphics data to the external display monitor and the internal display panel during the boot process.

9. The information handling system of claim 8, the operations further comprising sending a signal to a multiplexer to switch the source of the pre-operating system graphics data provided to the internal display panel.

10. The information handling system of claim 9, wherein the sending of the signal is performed by an embedded controller.

11. The information handling system of claim 8, wherein the pre-operating system graphics data is transmitted to the external display monitor via a Thunderbolt interface.

12. The information handling system of claim 8, wherein the discrete graphics processing unit is connected to a Thunderbolt controller.

13. The information handling system of claim 8, wherein the switching from the discrete graphics processing unit to the integrated graphics processing unit is performed before the information handling system boots to an operating system.

14. A non-transitory computer-readable medium to store instructions that are executable to perform operations comprising:
in response to a power event of an information handling system, setting a discrete graphics processing unit to transmit pre-operating system graphics data to an external display monitor and an internal display panel that is coupled to an integrated graphics processing unit during a boot process;
in response to determining that a hybrid graphics mode is enabled and that a video driver has been loaded during the boot process, switching a source of the pre-operating system graphics data to the internal display panel from the discrete graphics processing unit to the integrated graphics processing unit while keeping the discrete graphics processing unit to transmit the pre-operating system graphics data to the external display monitor allowing pre-operating system graphics data to be displayed at both the internal display panel and the external display monitor; and
in response to determining that the hybrid graphics mode is not enabled and that the video driver has not been loaded during the boot process, keeping the discrete graphics processing unit to transmit the pre-operating system graphics data to the external display monitor and the internal display panel during the boot process.

15. The non-transitory computer-readable medium of claim 14, further comprising sending a signal to a multiplexer to switch the source of the pre-operating system graphics data provided to the internal display panel.

16. The non-transitory computer-readable medium of claim 15, wherein the sending of the signal is performed by an embedded controller.

17. The non-transitory computer-readable medium of claim 14, wherein the pre-operating system graphics data is transmitted to the external display monitor via a Thunderbolt interface.

18. The non-transitory computer-readable medium of claim 14, wherein the discrete graphics processing unit is connected to a Thunderbolt controller.

19. The non-transitory computer-readable medium of claim 14, wherein a lid housing the internal display panel is closed.

20. The non-transitory computer-readable medium of claim 14, wherein the switching from the discrete graphics processing unit to the integrated graphics processing unit is performed before the information handling system boots to an operating system.

* * * * *